United States Patent [19]

Hoffman, Jr.

[11] Patent Number: 4,725,865
[45] Date of Patent: Feb. 16, 1988

[54] DISPOSABLE FILM PACKAGE AND HOLDER FOR USE THEREWITH

[75] Inventor: Robert H. Hoffman, Jr., Nashville, Tenn.

[73] Assignee: Deep Creek Design, Inc., Nashville, Tenn.

[21] Appl. No.: 773,240

[22] Filed: Sep. 6, 1985

[51] Int. Cl.4 .............................. G03B 17/26
[52] U.S. Cl. ...................................... 354/276
[58] Field of Search ..................... 354/276–279, 354/281–285

[56] References Cited

U.S. PATENT DOCUMENTS

| | | |
|---|---|---|
| 268,297 | 11/1882 | Scofield . |
| 406,085 | 7/1889 | Carlisle . |
| 660,394 | 10/1900 | Reardon .................. 354/276 |
| 689,271 | 12/1901 | Ashford et al. .......... 354/284 |
| 791,922 | 6/1905 | Lyon ........................ 354/282 |
| 915,988 | 3/1909 | Moore ...................... 354/282 |
| 947,946 | 2/1910 | Schmuck .................. 354/276 |
| 1,070,843 | 8/1913 | Price ........................ 354/282 |
| 1,305,096 | 5/1919 | Hansen .................... 354/283 |
| 1,505,000 | 8/1924 | Whiting ................... 354/282 |
| 2,017,709 | 10/1935 | Billing ..................... 354/283 |
| 2,070,778 | 2/1937 | Billing ..................... 354/276 |
| 2,153,995 | 4/1939 | Schwartz ................. 354/276 |
| 2,447,468 | 8/1948 | Reyniers . |
| 2,487,982 | 11/1949 | Reyniers . |
| 2,497,270 | 2/1950 | Panosian . |
| 2,552,905 | 5/1951 | Panosian . |
| 2,708,864 | 5/1955 | Land . |
| 2,946,271 | 7/1960 | Craig . |
| 3,091,168 | 5/1963 | Craig . |
| 3,613,545 | 10/1971 | Cohn . |
| 3,751,253 | 8/1973 | Cohn . |
| 4,186,308 | 1/1980 | Erikson ................... 250/480 |

Primary Examiner—Donald A. Griffin
Attorney, Agent, or Firm—Barnes & Thornburg

[57] ABSTRACT

A disposable package for cut photographic film and a holder adopted for use therewith. The film package provides a light excluding envelope into which is inserted a planar carrier bearing a sheet of photographic film affixed thereto by an adhesive backed opaque mask element. One end of the carrier has an elongated tab which, together with the end of the envelope, extends substantially outside the holder when the film package is fully inserted therein, and which may be grasped along with the envelope to facilitate withdrawal of the package from the holder. The open end of the envelope is rendered light tight when the carrier is fully inserted therein by the engagement of the edges of the open end with recesses in an elongated transverse clip attached to the carrier at the end opposite the tab. The holder comprises a top portion having a light transmitting window therethrough and a bottom portion, the top and bottom portions being positioned in parallel spaced relationship to each other so as to define a path for the insertion and withdrawal of the film package therebetween. The top portion is moveable relative to the bottom portion between a first relatively more distant position and a second relatively closer position and is biased in the first position by a pair of wave springs, which also serve to hold the film in the plane of focus. When the top portion is in the second position a tab provided therein engages with the transverse clip on the carrier to prevent the carrier from being withdrawn from the holder.

63 Claims, 23 Drawing Figures

DISPOSABLE FILM PACKAGE AND HOLDER FOR USE THEREWITH

BACKGROUND AND SUMMARY OF THE INVENTION

The subject matter of this invention is described in Disclosure Document No. 120357 filed Sept. 6, 1983.

This invention relates in general to holders for cut photographic film. More specifically, it is directed to a new disposable package for cut photographic film, and an improved holder for use therewith.

In the field of professional photography, the use of relatively large format cut photographic film is preferred for many applications. This type of film is conventionally preloaded in the dark room into rectangular film "holders," each of which accommodates two sheets of cut film. Such film holders are subsequently inserted into an aperture in the back of the camera for exposure, withdrawn and return to the dark room for unloading and developing. An example of this type of holder is sold by Lisco Manufacturing Co. under the trade name "LISCO REGAL."

In order to have an adequate supply of film, it is necessary for the photographer to preload a large number of such film holders, to transport them to the location where they are being used, and to transport them back to the dark room for unloading and processing. Such an arrangement has a number of disadvantages. Primary among these are the relative bulk and weight of the holders themselves, each loaded holder weighing about 7 ounces, the time required to preload the holders, the potential for incorrect loading, and the risk of contamination and finger prints. Temperature and oxidation control of the unused portion of the film stock contained in the opened bulk pack in which the supply of cut film is purchased are also a problem. Once the air tight manufacturer's seal is broken to remove only a few sheets of color film from a bulk pack, the remainder cannot be returned to cold storage, as is generally required with professional photographic film, because of moisture condensation risk; and because the package is no longer airtight, the film begins to oxidize. Thus, if the film in a broken pack is not used promptly, it is usually discarded to avoid the risk of spoilage and loss of work product.

A number of attempts have been made in the past to remedy these problems by providing a disposable film package which can be loaded into a film holder in daylight at the point of use, and withdrawn after the film has been exposed. In this manner, a single holder can be reused, eliminating both the need to transport large numbers of film holders on location, and the requirement for dark room preloading and unloading of film by the photographer.

Typically such disposable film packages consist of a substantially flat film carrier to which two sheets of cut film are attached, one on each side of the carrier. The carrier is packaged in an envelope having one open end through which the carrier may be withdrawn for exposure. In use, the film package is to be inserted into the holder, open end first so that the sheets of film are properly positioned in the holder for exposure in a camera. Once the package is fully inserted into the holder, means are provided for locking the carrier in position so that the envelope may be withdrawn leaving the sheets of film ready to be exposed. After exposure, the envelope is to be reinserted into the holder, over the film carrier. The carrier is then unlocked so that the package, with the carrier once again contained in the envelope, may be removed, turned over and reinserted to expose the second sheet of film.

Two examples of such disposable film packages are disclosed in U.S. Pat. Nos. 689,271 to Ashford et al. and 1,505,000 to Whiting. One of the principal difficulties encountered in all such prior art film packages centers around the necessity of providing and maintaining a light tight seal at the open end of the envelope at all times when the package is outside of the holder. The Ashford et al. patent attempts to provide such a seal by means of an enlargement at one end of the carrier having a recess into which the edges of the open end of the envelope may be inserted. The principal disadvantage of the Ashford et al. arrangement is that the light tight seal is particularly apt to be breached by incomplete or incorrect reinsertion of the envelope after its withdrawal for exposure of the film, by improper seating of the open end of the envelope due to incorrect alignment with the recess upon reinsertion, or by separation of the open end of the envelope from the recess due to jostling upon withdrawal. This difficulty is compounded by the fact that both the Ashford et al. and Whiting inventions anticipate that the envelope will be completely withdrawn from the carrier, thereby causing a certain amount of jiggling of the carrier as the operator attempts to align the envelope for reinsertion.

This shortcoming was less important at the time when the Ashford et al. and Whiting packages were conceived because the relatively slow speed of film then in use allowed the photographer adequate opportunity to correct any break in the light seal due to incorrect or improper seating of the envelope. With modern high speed photographic film, however, any light leakage, however small, is likely to ruin a piece of film in only a tiny fraction of a second.

Accordingly, it is a principal object of the present invention to provide a disposable film package having a highly dependable means for establishing and maintaining a light tight seal at the open end of the package's outer envelope.

Another object of this invention is to provide a disposable film package which may be withdrawn from the film holder in such a manner as to prevent accidental breach of the light tight seal.

Another object of this invention is to provide a disposable film package with means to assure withdrawal of the external envelope only as far as is necessary to allow complete exposure of the film.

Still another object of this invention is to provide a disposable film package having means to provide for the correct alignment of the envelope and the carrier upon reinsertion of the envelope into the holder, thereby assuring correct and complete sealing of the open end of the envelope.

Yet another object of this invention is to provide a new film holder for use with the disposable film package, which is simple, lightweight, economical in construction and convenient to use.

Another object of this invention is to provide a new film holder for use with the disposable film package having improved means for retaining the carrier in the holder when the film is withdrawn.

These and other objects of the invention will be more fully understood from the following detailed description of the preferred embodiments which should be read in light of the accompanying drawings.

DETAILED DESCRIPTION OF THE PREFERRED EMBODIMENTS

Figure 1:
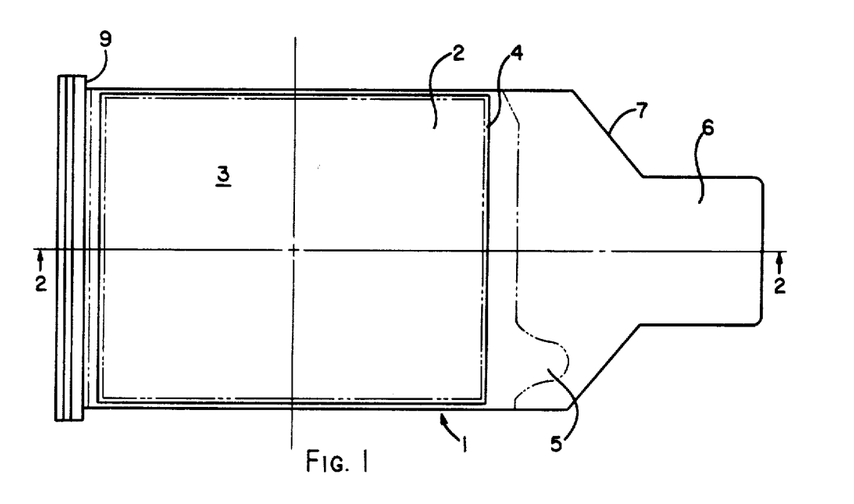
FIG. 1 is a plan view of a film carrier which forms a part of the disposable film package in accordance with the teachings of the invention.
Figure 2:
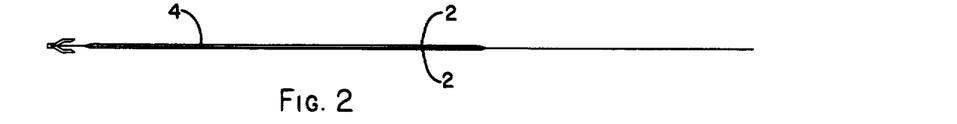
FIG. 2 is a longitudinal sectional view taken generally along line 2—2 of FIG. 1.
Figure 3:
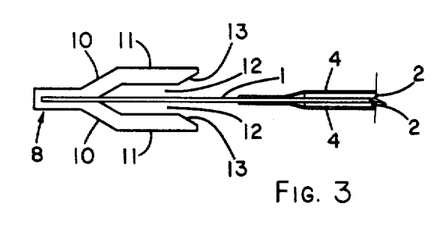
FIG. 3 is an enlarged detail view of a portion of FIG. 2.

Referring now more particularly to the drawings, and specifically to FIGS. 1-3, there is illustrated a photographic film carrier, generally designated 1, to which may be detachably secured two sheets of cut photographic film 2 in a film carrying region 3 on either side of the carrier. Each of the film sheets is held in place on the carrier by an adhesive back opaque peripheral mask 4 having a non adhesive backed tab 5 which may be grasped to facilitate removal of the film from the carrier for processing.

At one end of the carrier there is an elongated tab portion designated generally as 6. In the preferred embodiment, the width of the tab is substantially smaller than that of the film carrying region 3, and the width of carrier increases gradually from the elongated tab 6 to the film carrying region, so that the edges of the carrier are inclined as shown at 7.

At the other end of the carrier 1 is a rigid light sealing clip 8 which extends transversely of said carrier, extending somewhat beyond the edges thereof as shown at 9. In the preferred embodiment, the carrier and the light sealing clip are made of molded and stamped opaque plastic. The clip 8 has a first pair of transverse flanges 10 which are inclined relative to the plane of the carrier, toward the tabbed end thereof, and a second pair of transverse flanges 11 disposed in parallel spaced relationship to the plane of the carrier thereby defining a pair of transverse recesses 12 between the clip and the carrier. The edges 13 of the second pair of transverse flanges 11 are inclined relative to said carrier, toward the tabbed end thereof so as to provide said clip 8 a funnel shaped cross section as best seen in FIG. 3.

Figure 4:
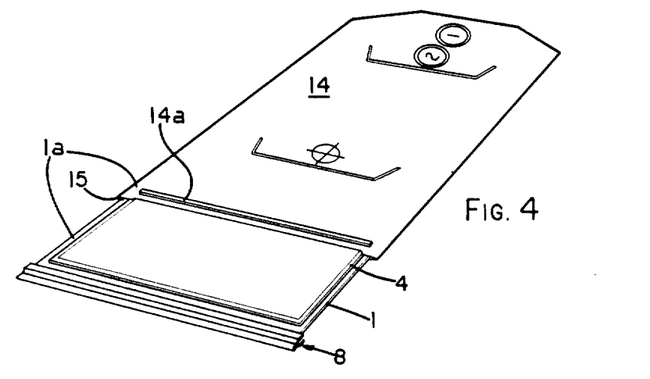
FIG. 4 is a perspective view of the disposable film package with the carrier partially withdrawn therefrom.
Figure 5:
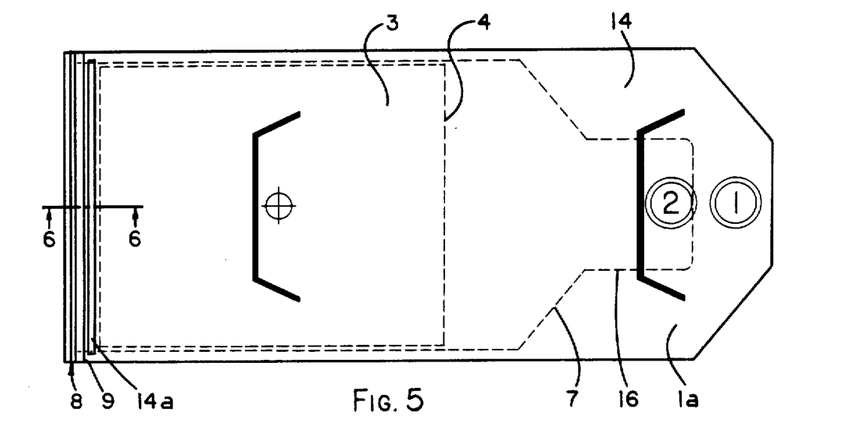
FIG. 5 is a plan view of the disposable film package with the carrier fully inserted therein.
Figure 6:
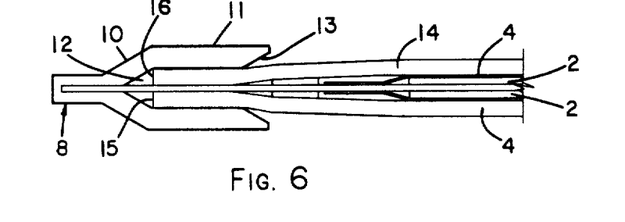
FIG. 6 is a longitudinal sectional view taken generally along line 6—6 of FIG. 5.

The carrier 1, with the film 2 and mask 4 attached thereto are packaged in an opaque light excluding exterior envelope 14 having one open end 15, as shown in FIGS. 4-8. FIG. 4 depicts the film package designated generally as 1a with the carrier 1 partially withdrawn from the open end 15 of the envelope 14. FIGS. 5 and 6 show a plan view and a partial sectional view (6—6), respectively of the envelope 14 with the carrier fully inserted therein. As can best be seen in FIG. 6, when the carrier is fully inserted into the envelope, the edges 16 of the open end 15 of the envelope engage with the recess 12 of clip 8 to form a light tight seal.

As can also be seen in FIG. 6, envelope 14 has a pair of raised portions or ribs 14a disposed transversely on the exterior surfaces thereof. Said ribs, which may be constructed of heavy paper or cardboard, cooperate with the film holder in a manner to be described, to prevent the withdrawal of the envelope farther than is necessary for the complete exposure of the film.

Figure 7:
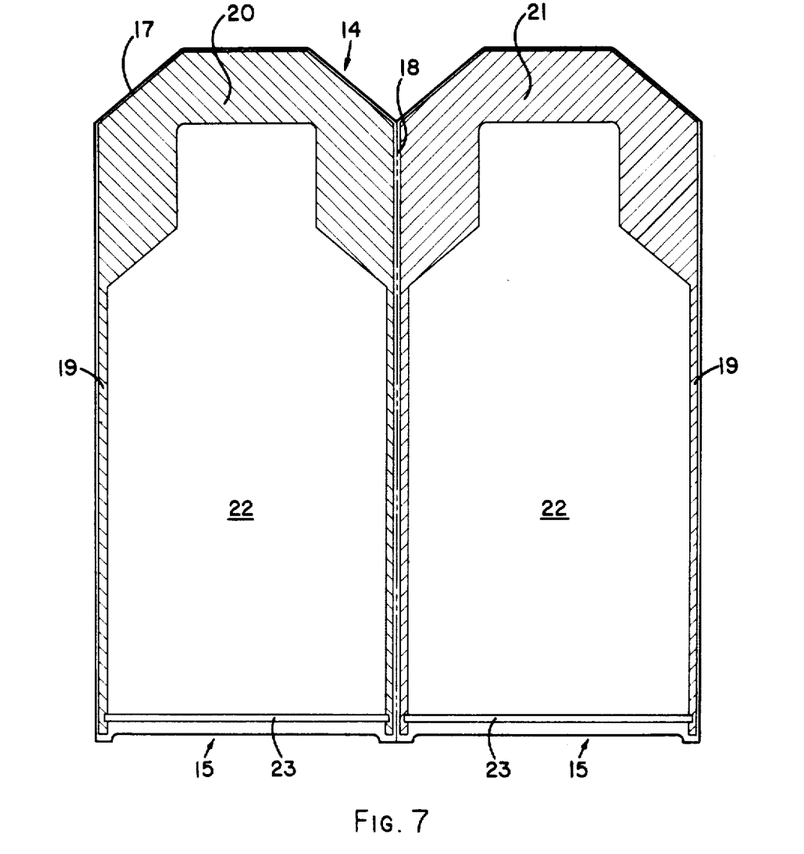
FIG. 7 is a plan view showing the inside surface of the cutout from which the envelope of the disposable film package is formed.
Figure 8:
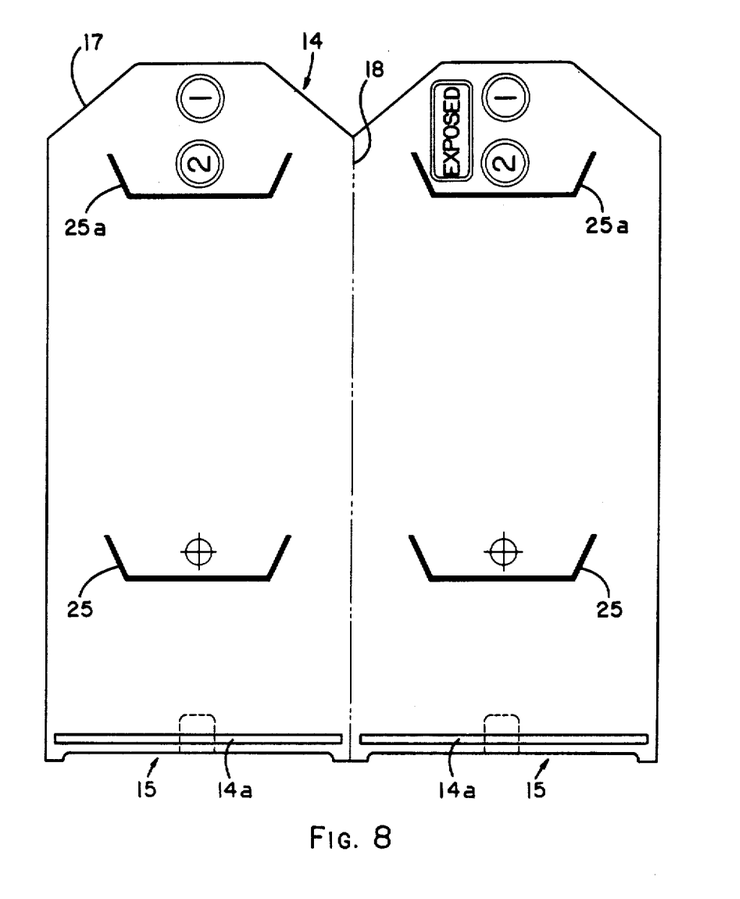
FIG. 8 is a plan view showing the exterior surface of the cutout.
Figure 9:
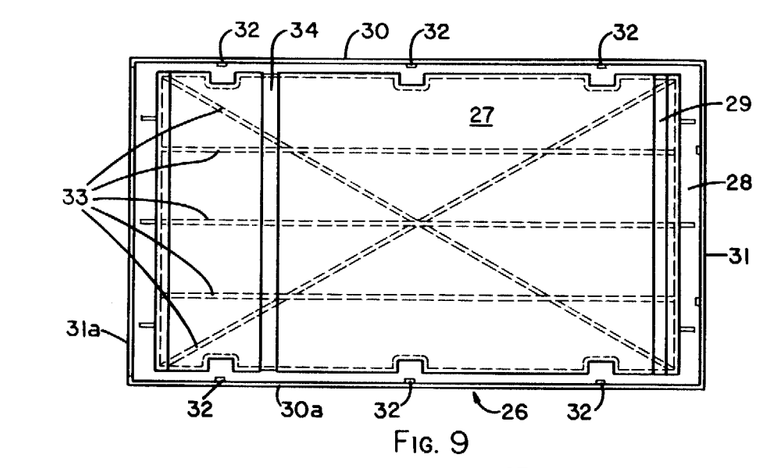
FIG. 9 is a plan view of the enclosure base, which forms a part of the film holder in accordance with the teachings of the invention.

As shown in FIGS. 7 and 8, the envelope 14 is constructed of a single die-cut sheet 17 of thin opaque material such as plastic or paper. FIG. 7 depicts the interior surface of the cut out 17, while FIG. 8 depicts the exterior surface thereof. To form the envelope, the cutout is folded along line 18 and glued along edges 19 and at the closed end 20. The glue pattern indicated by the cross hatched area 21 in FIG. 7 conforms to the shape of the tabbed end 6 of the carrier 1, thereby forming an interior pocket 22 of substantially the same size and shape as the tab 6. A light trap made up of two strips of black velvet 23 is provided across the open end 15 of the envelope 14.

The external surface of the cut out 17 has printed thereon alignment registration marks 25 and 25a, which cooperate with the external contour of the film holder, such as for example the existing Polaroid Model 545 holder, in a manner to be described, to prevent excessive withdrawal of the film package therefrom.

As illustrated in FIGS. 9-23, the improved film holder for use with the disposable film package is comprised generally of an enclosure base 26 and an enclosure cover 33a, the two being telescopically associated.

Figure 10:
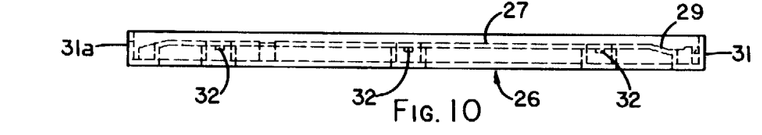
FIG. 10 is a side view of the enclosure base of FIG. 9.
Figure 11:
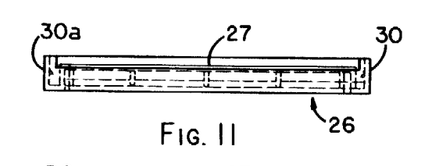
FIG. 11 is an end view of the enclosure base of FIG. 9.
Figure 12:
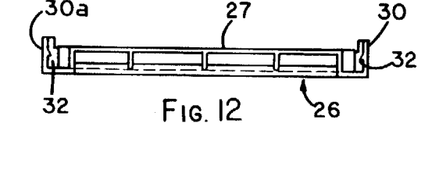
FIG. 12 is a transverse sectional view taken generally along line 12—12 of FIG. 9.
Figure 13:
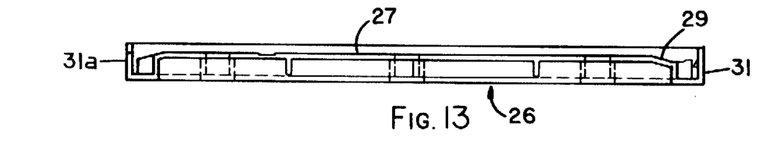
FIG. 13 is a longitudinal sectional view taken generally along line 13—13 of FIG. 9.

As depicted in FIGS. 9–13 the enclosure base 26 provides a raised, generally rectangular and planar film supporting surface 27 having one transverse end portion thereof 29 depressed slightly from the plane of the film supporting surface, as shown in FIGS. 10 and 13. Also disposed transversely of said film supporting surface is a strip of black velvet 34. The film supporting surface is reinforced by ribs 33 to strengthen it. Surrounding the film supporting surface 27 is a channel 28. The exterior sides of the enclosure cover 26 are defined by side walls 30, 30a and end walls 31, 31a. Disposed along the interior surface of side walls 30, 30a and end walls 31, 31a are a plurality of raised tabs 32.

Figures 14, 15, 16, 17, 18:
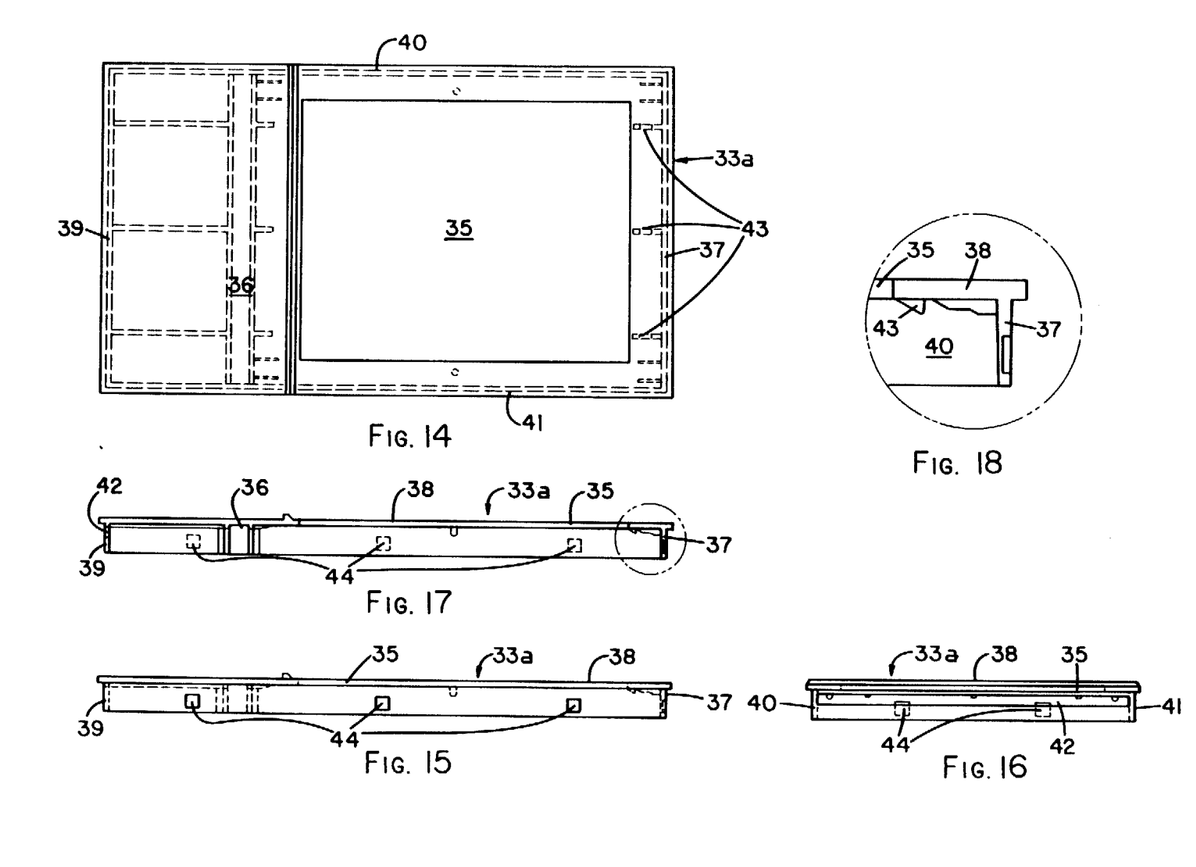
FIG. 14 is a plan view of the enclosure cover, which forms a part of the film holder in accordance with the teaching of the invention.
FIG. 15 is a side view of the enclosure cover of FIG. 14.
FIG. 16 is an end view of the enclosure cover of FIG. 14.
FIG. 17 is a longitudinal sectional view taken generally along line 17—17 of FIG. 14.
FIG. 18 is an enlarged detail view of a portion of FIG. 17.
Figure 19:
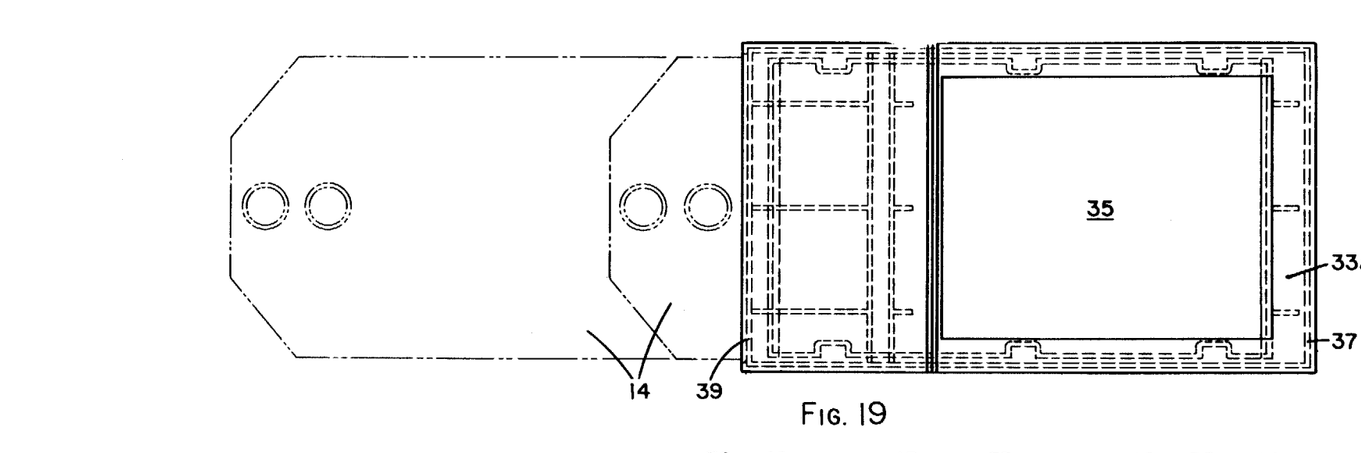
FIG. 19 is a plan view of a film holder in accordance with the invention.

The enclosure cover 33a, shown in FIGS. 14–18, has a generally flat upper surface 38 with a light transmitting window 35 therethrough, as best shown in FIG. 14; two end walls 37, 39 and two side walls 40, 41. End wall 39 has a transverse slot 42 adapted to accept insertion of the disposable film package. The interior of upper surface 38 has a transverse strip of black velvet 36, which cooperates with velvet strip 34 on the enclosure base 26, to form a light trap when the enclosure cover and base are nested as described below. Projecting downward from the interior of upper surface 38 are three tabs 43. As is best shown in FIG. 18, the edge of said tabs which is nearest slot 42 is inclined at an acute angle with respect to upper surface 38, while the edge farthest from slot 42 is inclined at a substantially perpendicular obtuse angle to said upper surface.

Figure 20:
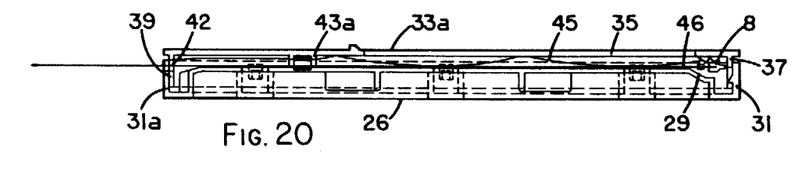
FIG. 20 is a longitudinal sectional view taken generally along line 20—20 of FIG. 19 showing the enclosure cover and enclosure base in their open or retracted position.
Figure 21:
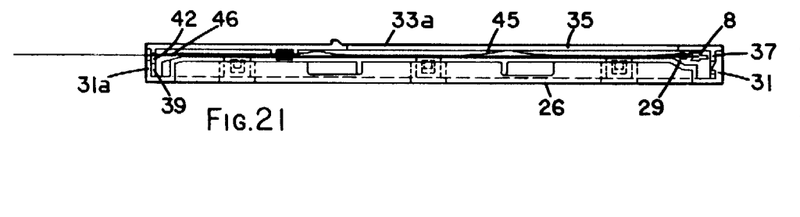
FIG. 21 is a longitudinal sectional view taken generally along line 20—20 of FIG. 19 showing the enclosure cover and enclosure base in their closed, camera set position.
Figure 22:
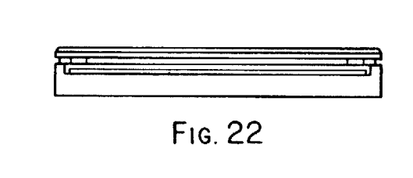
FIG. 22 is an end view of the film holder of FIG. 19, showing the enclosure cover and enclosure base in their open or retracted position.
Figure 23:
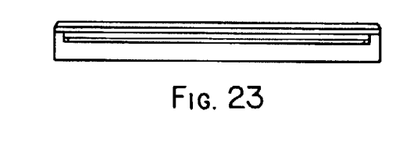
FIG. 23 is an end view of the film holder of FIG. 19, showing the enclosure cover and enclosure base in their closed, camera set position.

The exterior transverse and longitudinal dimensions of the enclosure cover 33a, as measured between the exterior surfaces of side walls 40, 41 and end walls 37, 39, are nominally smaller than the interior dimensions of the enclosure base 26, measured between the interior surfaces of side walls 30, 30a and end walls 31, 31a so that the two may be nested together as shown in FIGS. 19–23 to form film holder 47. When enclosure cover 33a is inserted into enclosure base 26, as shown in FIG. 20, tabs 32 on the interior of enclosure base side walls 30, 30a and end walls 31, 31a engage with a plurality of corresponding apertures 44 in enclosure cover side walls 40, 41 and end walls 37, 39, to limit the extent of outward movement of enclosure cover 33a with respect to enclosure base 26. As shown in FIGS. 20 and 21, enclosure cover 33a is biased by wave springs 45 into its outermost ("open") position with respect to enclosure base 26, as limited by tabs 32 and apertures 44. When, however, downward pressure is applied to the exterior surface of enclosure cover 33a, so as to compress wave springs 45, said cover 33A moves to a second, relative closer ("closed") position with respect to base 26.

As can best be seen in FIG. 20, the interior of upper surface 38 of enclosure cover 33a cooperates with the film supporting surface 27 of enclosure base 26 to form an enclosed pathway 46 which communicates with the exterior of the holder 47 through slot 42 in end wall 39 of the enclosure cover.

In use, the disposable film package 1a is inserted through slot 42 along pathway 46 into position with the film bearing region of carrier 3 disposed in aligned registration with window 35 in the enclosure cover, and transverse light sealing clip 8 residing in transverse depression 29 in film supporting surface 27. FIG. 20 shows the holder 47 in the open position with disposable film package 1a inserted therein. The enclosure cover and base are then compressed into their closed position as shown in FIG. 21.

Compression of the film holder 47 into its closed position accomplishes three objectives. First, film supporting surface 27 engages with envelope 14 and carrier 1, pressing them against the interior of upper surface 38 of the enclosure cover, thereby holding the carrier in a planar position adjacent said upper surface and window 35. Second, velvet strips 34 and 36 engage with the exterior of the disposable film package 1a, to form a light trap, excluding ambient light from pathway 46. Finally, tab 43 on the interior of upper surface 38 of the enclosure cover moves downward into the pathway 46 and engages with the edge of flange 11 on light sealing clip 8 preventing the withdrawal of carrier 1 from holder 47.

The thickness of film holder 47 in its closed position is such that it may be inserted into a standard large format camera in the usual manner, the spring loaded interior surfaces of the camera back maintaining the film holder in its closed position. With the holder in the camera, envelope 14 may be withdrawn from carrier 1, by grasping the envelope in the vicinity of glue pattern 21, sufficiently far to uncover film 2 adjacent window 35. Withdrawal of carrier 1 together with envelope 14 is prevented by tab 43 which obstructs pathway 46 and prevent light sealing clip 8 from moving with said envelope. The outward movement of the envelope is limited by transverse rib 14a on the outer surface of envelope 14, which engages with stop 43a on the interior of the upper surface 38 of enclosure cover 33a when envlope 14 has been withdrawn a sufficient distance to be clear of window 35. Should stop 43a for any reason fail to engage rib 14a, the alignment registration marks 25 on envelope 14 provide the photographer with visual confirmation that the envelope has been fully withdrawn, when the same are visible just clear of the film holder.

After the film has been exposed, envelope 14 is reinserted into the film holder 47 and over carrier 1 so that the edges 16 of open end 15 of the envelope once again engage with recess 12 in light excluding clip 8. Two features of the disposable film package combine to assure that edges 16 are properly seated in recess 12: First, tab 6 of carrier 1 cooperates with the shape of interior pocket 22 of envelope 14 as the latter is slid back into engagement therewith, to assure that the envelope is properly aligned with the carrier and with transverse light sealing clip 8. Second, the funnel shaped cross section of clip 8 formed by inclined edges 13 serves to guide the envelope into recess 12. Registration marks 25a afford visual confirmation that the envelope has been fully and properly inserted onto the carrier when said marks reside immediately adjacent to slot 42 of the holder.

The film holder 47 is then withdrawn from the camera. With the removal of pressure exerted by the camera back, wave springs 45 will return the holder to its open position, with tabs 43 withdrawn from engagement with light sealing clip 8. At this point the disposable film package 1a may be withdrawn from the holder 47. Since the carrier has sheets of film on both sides, the package may be turned over, reinserted into the film holder and the process repeated.

It is most important that when the disposable film package 1a is removed from the holder, the proper seating of edges 16 of envelope 15 in recess 12 not be disturbed. Otherwise, the light seal provided by clip 8 may be broken, and fogging of the film will result. Such occurrence is prevented by the protrusion of tab 6 (inside envelope 14), outside the holder when film package 1a is in the fully inserted position, a distance which is sufficient to allow the photographer to grasp the envelope 14 in the area of tab 6 and to apply pressure thereto, providing positive physical, and tactile assurance that carrier 1 is withdrawn from the holder along with envelope 14 and that the light tight seal provided by clip 8 is maintained.

It can be seen from the foregoing that the present invention provides a disposable film package and film holder which fully accomplish their intended objectives, and, due to their simplicity, as well adapted to satisfy the practical requirements of modern manufacturing processes.

Although the present invention has been described in detail by way of illustration and example for purposes of clarity, it should be understood that certain changes and modifications may be made within the spirit of the invention.

I claim:

1. For use with a photographic film holder of the type adapted to be inserted into a camera, a package for at least one sheet of photographic film comprising:
   (a) a light excluding envelope having one open end;
   (b) a carrier with which a sheet of film may be detachably associated, said carrier being withdrawably insertable into the open end of said envelope;
   (c) said carrier having first and second end regions at opposite ends thereof and a film carrying region disposed therebetween;
   (d) the first end region of said carrier comprising a tab portion, said tab portion being of such length as to protrude substantially outside said film holder when said package, with the carrier inserted therein, is fully inserted into the film holder, and being adapted to be a clampingly grasped together with said envelope for withdrawal of the package from said holder;
   (e) means attached to said carrier at said second end region and engagable with the open end of said envelope for excluding light therefrom when said carrier is fully inserted into said envelope.

2. A film package as described in claim 1 in which said tab portion is of a width substantially narrower than that of the film carrying region and the second end region of the carrier, the edges of the carrier between said tab and the film carrying region being inclined from the edges of the tab to the edges of the film carrying region.

3. A film package as described in claim 2 in which the light excluding envelope comprises two layers of light exluding material attached at their perimeter along both sides and at one end thereof so as to define an interior sheeth having an opening at one end thereof, with the shape of said sheeth at the end opposite the open end of said envelope conforming substantially to the shape of the tab and the inclined edges of the carrier.

4. A film package as described in claim 1 in which the light excluding envelope has removably attached to the exterior thereof means for sealing the film package after exposure to prevent subsequent withdrawal of the carrier from the envelope.

5. A film package as described in claim 4 in which said means for sealing is a gummed adhesive label.

6. A film package as described in claim 1 in which the light excluding envelope has on the exterior thereof printed means cooperating with the film holder for indicating when the envelope has been fully inserted into the film holder and when the envelope has been fully withdrawn from the film carrying region of the carrier.

7. A film package as described in claim 1 in which said carrier has a film carrying region on both sides thereof.

8. A film package as described in claim 1 in which said means for excluding light from the open end of the envelope comprises a cross member disposed transversely of said carrier being of a width at least equal to the width of the envelope and having coextensive therewith on each side of said carrier:
   (a) a recess adapted to engage the edges of the open end of the envelope; and
   (b) a flange being inclined with respect to said carrier upwardly toward the first end region of said carrier, whereby the edges of the open end of the envelope are guided into said recesses as said carrier is inserted therein.

9. A film package as described in claim 8 in which said cross member is adapted to cooperate with said film holder to retain said carrier therein when the film holder is inserted into a camera, and to release said carrier when the film holder is withdrawn from said camera.

10. A film package as described in claim 1 in which said envelope has associated therewith, safety stop means for selectively preventing the complete withdrawal of the envelope therefrom when said film holder is inserted in said camera.

11. A film package as described in claim 10 in which said safety stop means comprises a transverse ridge on the surface of the envelope, said ridge being adapted to cooperate with the film holder to prevent complete withdrawal of the envelope therefrom.

12. A disposable film package as described in claim 1 which further comprises an opaque mask removably attached to said carrier and adapted to hold a sheet of photographic film adjacent to the film carrying region on at least one side of the carrier, said mask having a light transmitting opening therethrough and a nonadhesive tab adapted to facilitate the removal of said mask from said carrier.

13. For use with a removable photographic film package having a light excluding envelope sealed at one end by a transverse light excluding member, a photographic film holder, comprising:
   (a) a bottom portion;
   (b) a top portion positioned in spaced relationship to said bottom portion whereby a film package receiving cavity is defined between said top portion and said bottom portion, said top portion being moveable transversely relative to said bottom portion between a first position and a second position; and
   (c) film position retention means operative when said top portion is in said second position, for preventing withdrawal of said film package from the holder and operative when said top portion is in said first position permitting withdrawal of said film package from the holder.

14. A photographic film holder as described in claim 13 in which said first position of said top portion is relatively more distant from said bottom portion, and said second position is relatively closer thereto, and wherein said film holder is configured so that said top portion is resiliently automatically moved to said second position when inserted in a camera back with spring-loaded interior surfaces.

15. A photographic film holder as described in claim 13 which further comprises means for biasing said top portion in said first position.

16. For use with a photographic film package having a light excluding envelope sealed at one end by a transverse light excluding member, a photographic film holder, comprising
   (a) a bottom portion having a substantially planar film supporting surface;
   (b) a top portion having a substantially planar top surface, said top portion being so positioned that said planar top surface is in parallel spaced proximity to said film supporting surface, the space between said top surface and said film supporting surface being sufficient to provide a path for the insertion of said film package therebetween and the withdrawal of said film package therefrom, said top portion being moveable relative to said bottom portion, in a direction substantially perpendicular to said film supporting surface, between a first position relatively more distant from said bottom portion and a second position relatively closer to said bottom portion;
   (c) means for biasing said top portion in said first position; and
   (d) film position retention means operative when said top portion is in said second position for engaging with said cross member of the film package to prevent withdrawal of said cross member from the holder.

17. A film holder as described in claim 16 in which said film position retention means comprises a fixed rigid member attached to said top portion which, when said top portion is in said second position, projects into the path for the insertion or withdrawal of the film package to a depth sufficient to block the passage of said cross member along said path.

18. A film package for insertion into a photographic film holder, comprising:
   light excluding envelope means,
   film carrier means for carrying at least one sheet of photographic film, said film carrier means extending at least the length of the film and being slidably moveable within the light excluding envelope means between a storage position with said film held light tight within the envelope means and an exposing position with said film uncovered,
   and film guide means provided on said envelope means for guiding the slidable movement of the film within said envelope means.

19. A film package according to claim 18, wherein said film carrier means has a fixedly attached envelope closure means at one side of the film carried thereby and a fixedly attached tab means extending beyond the other opposite side of the film carried thereby.

20. A film package according to claim 19, wherein said film guide means includes reinforcing guide track means on the lateral internal sides of the envelope.

21. A film package according to claim 20, wherein said film guide means includes lateral edge portions of the carrier means slidably engageable with the internal guide track means.

22. A film package for insertion into a photographic film holder, comprising:
   light excluding envelope means,
   film carrier means for carrying at least one sheet of photographic film, said film carrier means extending at least the length of the film and being slideably moveable within the light excluding envelope means between a storage position with said film held light tight within the envelope means and an exposing position with said film uncovered,
   and envelope closure means fixedly disposed with respect to the film carrier means during slidable movement of the carrier means, said envelope closure means including means for forming a light tight closure of said envelope means when in said storage position, including when the film package is outside of the film holder.

23. A film package according to claim 22, wherein said envelope closure means is fixedly connected to an end portion of the film carrier means.

24. A film package according to claim 23, wherein said envelope closure means includes guide means for guiding movement of the envelope means into said storage position.

25. A film package according to claim 24, wherein said guide means includes a guide clip attached to an end portion of the carrier means and including guide surfaces spaced transversely of the plane of the carrier means.

26. A film package according to claim 24, wherein said guide surfaces are spaced along the travel direction of the carrier means from the film carrier thereby.

27. A film package according to claim 25, wherein said guide clip is made of molded plastic.

28. A film package according to claim 24, wherein said carrier means includes means for carrying two sheets of film, one at each respective opposite side of the carrier means, and wherein said guide clip guide surfaces form a substantial U-shaped opening facing toward the location of the attachment of the film sheets.

29. A film package for insertion into a photographic film holder, comprising a light excluding envelope having one open end; an opaque carrier with which at least one sheet of film may be detachably associated, said carrier being withdrawably insertable into the open end of said envleope; film safety withdrawal means for preventing relative movement between said carrier and said envelope during withdrawal of said film package from said holder after exposure of the film; and envelope closure means fixedly disposed with respect to the film carrier means during slidable movement of the carrier means, said envelope closure means including means for forming a light tight closure of said envelope when in said storage position, said envelope closure means comprising an opaque clip connected at one end of the carrier said clip being configured to clampingly close the open end of the envelope to form a light tight seal when said film package is outside of the film holder, said carrier is a plastic carrier and said clip is a rigid plastic clip.

30. A film package for insertion into a photographic film holder, comprising:
   a light excluding envelope having one open end;
   a carrier with which at least one sheet of film may be detachably associated, said carrier being withdrawably insertable into the open end of said envelope; and
   envelope closure means fixedly disposed with respect to the film carrier means during slideable movement of the carrier means, said envelope closure means including means for forming a light-tight closure of said envelope when in a storage position outside of a film holder, said envelope closure means comprising rigid clip means including elastically deformable clamp portions to clampingly close the open end of the envelope to form a light-tight seal when said film package is outside of the film holder.

31. A film package according to claim 30 further comprising film safety withdrawal means for preventing relative movement between said carrier and said envelope during withdrawal of said film package from said holder after exposure of the film, wherein said film safety withdrawal means includes manually engageable tactile means for accommodating detecting relative positions of the carrier and envelope without visual observation.

32. A film package according to claim 31, wherein said tectile means includes a tab on the film carrier which extends beyond the film carried thereby and is manually clampable from the outside by grasping the envelope.

33. A film package according to claim 32 in which the light excluding envelope has on the exterior thereof printed means cooperating with the film holder for indicating when the envelope has been fully inserted into the film holder and when the envelope has been fully withdrawn from the film carrying region of the carrier.

34. A film package according to claim 33 in which said carrier has a film carrying region on both sides thereof.

35. A film package according to claim 30 wherein said clip means is a rigid nonmetallic clip.

36. A film package according to claim 35, wherein said clip is a rigid plastic clip.

37. A film package according to claim 30, wherein said carrier is made of plastic sheet material.

38. A film package according to claim 37, wherein said clip means is a rigid plastic clip fixedly connected to one end of the carrier sheet material.

39. A film package according to claim 30, further comprising at least one sheet of film attached to the carrier.

40. A film package according to claim 30, further comprising two sheets of film attached to the carrier at respective opposite sides thereof.

41. A film package according to claim 40, wherein said clip means is fixedly connected to said carrier at a spacing from the sheets of film.

42. A film package according to claim 41, wherein said carrier is made of opaque plastic sheet material and said clip means is a rigid plastic clip fixedly connected to an end of the carrier sheet material.

43. A film package according to claim 40, wherein the sheets of film are held in place on the carrier by an adhesive-packed opaque peripheral mask.

44. A film package according to claim 43, wherein said mask has a manually graspable tab to facilitate removal of the film from the carrier for processing.

45. A film package according to claim 44, wherein an elongated tab portion is provided at one end of the carrier which extends beyond the sheets of film, said elongated tab portion being narrower than areas of the carrier where said sheets of film are attached.

46. A film package according to claim 45, wherein said envelope is constructed of a single die cut sheet of thin opaque material.

47. A film package according to claim 30, wherein said envleope is constructed of a single die cut sheet of thin opaque material.

48. A film package according to claim 47, wherein said envelope is constructed of paper.

49. A film package according to claim 47, wherein said envelope is constructed of plastic.

50. A film package according to claim 30, further comprising film guide means provided on said envelope for guiding the movement of film within said envelope.

51. A film package according to claim 50, wherein said film guide means includes reinforcing guide track means guidingly engageable with said carrier during movement of the film within said envelope.

52. A film package according to claim 51, further comprising two sheets of film attached to the carrier at respective opposite sides thereof.

53. A film package according to claim 52, wherein the sheets of film are held in place on the carrier by an adhesive-backed opaque peripheral mask.

54. A film package according to claim 53, wherein said mask has a manually graspable tab to facilitate removal of the film from the carrier for processing.

55. A disposable film package for insertion into a photographic film holder, comprising:
a light excluding envelope having one open end:
light sensitive emulsion carrying means withdrawably insertable into the open end of said envelope; and
envelope closure means fixedly disposed with respect to the light sensitive emulsion carrying means during slideable movement thereof, said envelope closure means including means for forming a light-tight closure of said envelope when in a storage position outside of a film holder, said envelope closure means comprising nonmetallic rigid clip means including elastically deformable clamp portions to clampingly close the open end of the envelope to form a light-tight seal when said film package is outside of the film holder, wherein said light sensitive emulsion carrying means includes means for carrying two separate oppositely facing light sensitive emulsion surfaces.

56. A disposable film package according to claim 55, wherein said light sensitive emulsion carrying means includes an opaque carrier with a pair of sheets of photographic film attached at respective opposite sides thereof.

57. A disposable film package according to claim 56, wherein said clip means is a rigid plastic clip which includes funnel-shaped guide surfaces for guiding movement of the light sensitive emulsion carrying means into the closed storage position in said envelope.

58. A disposable film package according to claim 55, wherein said clip means is a rigid plastic clip which includes funnel-shaped guide surfaces for guiding movement of the light sensitive emulsion carrying means into the closed storage position in said envelope.

59. A disposable film package according to claim 58, further comprising film guide means provided on said envelope for guiding the movement of film within said envelope.

60. A disposable film package according to claim 55, further comprising film guide means in the form of reinforcing guide track means on inside lateral edges of the envelope.

61. A disposable film package according to claim 55, wherein said envelope is constructed of a single die cut sheet of thin opaque material.

62. A disposable film package according to claim 61, wherein said envelope is constructed of paper.

63. A disposable film package according to claim 61, wherein said envelope is constructed of plastic.

* * * * *

UNITED STATES PATENT AND TRADEMARK OFFICE
CERTIFICATE OF CORRECTION

PATENT NO. : 4,725,865

DATED : February 16, 1988

INVENTOR(S) : Robert H. Hoffman, Jr.

It is certified that error appears in the above-identified patent and that said Letters Patent is hereby corrected as shown below:

Please add to the Title Page under References Cited, the following U.S. Patent Documents:

| | | | |
|---|---|---|---|
| 729,325 | 5/1903 | Goodwin | 354/178 |
| 799,572 | 9/1905 | Lyon | 354/282 |
| 818,543 | 4/1906 | Leistenschneider | 354/282 |
| 3,053,160 | 9/1962 | Bachelder, et al | 354/086 |
| 3,586,501 | 6/1971 | Norquist, et al | 354/085 |

Please add to the Title Page under References Cited, the following Foreign Patent Documents:

| | | |
|---|---|---|
| 16821 | 1898 | Great Britain |
| 13038 | 1906 | Great Britain |
| 19864 | 1907 | Great Britain |

In the Background and Summary of the Invention:

Column 1, Line 20: change --return-- to --returned--

In the Detailed Description of the Preferred Embodiments:

Column 4, Line 3: change --back-- to --backed--

Column 6, Line 27: change --prevent-- to --prevents--

Column 6, Line 31: change --envlope-- to --envelope--

Column 7, Line 13: change --as-- to --are--

UNITED STATES PATENT AND TRADEMARK OFFICE
CERTIFICATE OF CORRECTION

PATENT NO. : 4,725,865
DATED : February 16, 1988
INVENTOR(S) : Robert H. Hoffman, Jr.

It is certified that error appears in the above-identified patent and that said Letters Patent is hereby corrected as shown below:

In the Claims:

Column 10, Claim 29, Line 43: change --envleope-- to --envelope--

Column 11, Claim 32, Line 18: change --tectile-- to --tactile--

Column 11, Claim 43, Line 54: change --adhesive-packed-- to --adhesive-backed--

Signed and Sealed this

Fifth Day of July, 1988

Attest:

DONALD J. QUIGG

Attesting Officer

Commissioner of Patents and Trademarks